(12) United States Patent
Murakami et al.

(10) Patent No.: US 9,115,734 B2
(45) Date of Patent: Aug. 25, 2015

(54) VEHICLE HEIGHT ADJUSTING DEVICE FOR MOTORCYCLE

(71) Applicant: SHOWA CORPORATION, Saitama (JP)

(72) Inventors: Yosuke Murakami, Shizuooka (JP); Tadashi Hachisuka, Shizuoka (JP); Takahiro Kasuga, Tochigi (JP); Fumiaki Ishikawa, Tochigi (JP)

(73) Assignee: SHOWA CORPORATION, Saitama (JP)

( * ) Notice: Subject to any disclaimer, the term of this patent is extended or adjusted under 35 U.S.C. 154(b) by 374 days.

(21) Appl. No.: 13/800,294

(22) Filed: Mar. 13, 2013

(65) Prior Publication Data
US 2014/0083093 A1   Mar. 27, 2014

(30) Foreign Application Priority Data
Sep. 25, 2012   (JP) ................... 2012-211511

(51) Int. Cl.
*B60G 17/04* (2006.01)
*F15B 15/20* (2006.01)
*B60G 17/08* (2006.01)
*B60G 17/016* (2006.01)
*B60G 17/056* (2006.01)
*B62K 25/02* (2006.01)

(52) U.S. Cl.
CPC ............. *F15B 15/20* (2013.01); *B60G 17/016* (2013.01); *B60G 17/0565* (2013.01); *B60G 17/08* (2013.01); *B62K 25/02* (2013.01); *B60G 2400/10* (2013.01); *B60G 2400/102* (2013.01); *B60G 2400/106* (2013.01); *B60G 2400/25* (2013.01); *B60G 2400/252* (2013.01); *B60G 2500/202* (2013.01); *B60G 2500/30* (2013.01)

(58) Field of Classification Search
CPC .. B60G 17/016; B60G 17/0565; B60G 17/08; B60G 2400/10; B60G 2400/102; B60G 2400/106; B60G 2400/25; B60G 2400/252; B60G 2500/202; B60G 2500/30
USPC ............. 280/5.514, 5.515, 5.501, 6.155, 6.15
See application file for complete search history.

(56) References Cited

U.S. PATENT DOCUMENTS 8,672,334 B1 *  3/2014  Murakami et al. ......... 280/5.514
8,807,259 B2 *  8/2014  Tominaga et al. ........... 180/219
8,844,944 B1 *  9/2014  Murakami ................. 280/5.514

FOREIGN PATENT DOCUMENTS

JP         1996-022680 B     3/1996

* cited by examiner

Primary Examiner — Faye M Fleming
(74) Attorney, Agent, or Firm — Keith Orum; Orum & Roth LLC

(57) ABSTRACT

An object of the present invention is to reduce current consumption for switching and holding an actuation position of an electromagnetic change-over valve included in a vehicle height adjusting device for a motorcycle and to surely hold the actuation position. In a rear-wheel side vehicle height adjusting device for a motorcycle, after applying a startup current to a solenoid of a change-over valve in order switch an actuation position of the change-over valve, while switching an applied current to the solenoid to a holding current which is smaller than the startup current and holding the actuation position of the change-over valve, a control section intermittently applies a large current, which is larger than the holding current, to the solenoid.

6 Claims, 13 Drawing Sheets

VEHICLE HEIGHT ADJUSTING DEVICE FOR MOTORCYCLE

BACKGROUND OF THE INVENTION

1. Field of the Invention

The present invention relates to a vehicle height adjusting device for a motorcycle.

2. Description of the Related Art

As a vehicle height adjusting device for a motorcycle, there is a vehicle height adjusting device for a vehicle employing a hydraulic attenuator as described in Japanese Examined Patent Publication No. H8-22680 (Patent Literature 1). The vehicle height adjusting device is a vehicle height two-stage adjusting device for reducing vehicle height during a stop and increasing the vehicle height during traveling. The vehicle height adjusting device can extend the hydraulic attenuator making use of an extension and compression action of the hydraulic attenuator to increase the vehicle height and arbitrarily change the vehicle height to a low position.

Specifically, a control valve is operated by an electromagnetic actuator actuated by manual operation or automatic operation making use of ejected oil by a pumping action due to stretching vibration of the hydraulic attenuator. The position of the control valve is selected to be a position for increasing the vehicle height and a position for reducing the vehicle height, whereby the vehicle height is arbitrarily switched to predetermined height or predetermined lowness.

Patent Literature 1: Japanese Examined Patent Publication No. H8-22680

SUMMARY OF THE INVENTION

In the vehicle height adjusting device for a motorcycle described in Japanese Examined Patent Publication No. H8-22680 (Patent Literature 1), current application to a solenoid of the electromagnetic actuator is controlled to open and close the control valve, the control valve is controlled to an open position to set the vehicle height to a low position, and the control valve is controlled to a closed position to a high position.

However, if a large rated current necessary for starting up the solenoid of the electromagnetic actuator is continuously fed to the solenoid in order to set the control valve in the open position or the closed position, it is likely that a coil is heated and burnt out. A load on a battery is undesirably excessively increases.

An object of the present invention is to reduce current consumption for switching and holding an actuation position of an electromagnetic change-over valve included in a vehicle height adjusting device for a motorcycle and surely hold the actuation position.

According to a first aspect of the present invention, there is provided a vehicle height adjusting device for a motorcycle including: a hydraulic pump and a hydraulic jack provided in a damper interposed between a vehicle body and an axle; an electromagnetic change-over valve configured to implement switching to connect a jack chamber of the hydraulic jack and an oil reservoir chamber of the damper; and control means for controlling current application to a solenoid of the change-over valve according to a detection result of vehicle height detecting means in order to control opening and closing of the change-over valve thereby supplying and discharging oil ejected by the hydraulic pump to and from the jack chamber of the hydraulic jack and adjusting vehicle height. After applying a startup current to the solenoid of the change-over valve to thereby switch an actuation position of the change-over valve, while switching an applied current to the solenoid to a holding current which is smaller than the startup current and holding the actuation position of the change-over valve, the control means intermittently applies a large current, which is larger than the holding current, to the solenoid.

According to a second aspect of the present invention, in the first aspect, the control means integrates a time of current application to the solenoid of the change-over valve or monitors a temperature of the solenoid and, when the integrated value of the current application time or the monitored temperature exceeds a fixed value, extends a current application interval for the solenoid or stops the current application to the solenoid or extends a time interval for intermittently applying the large current to the solenoid.

According to a third aspect of the present invention, in the first aspect, the control means monitors an applied current to the solenoid of the change-over valve and, when an abnormality occurs to the current application, stops the current application to the solenoid.

According to a fourth aspect of the present invention, in the first aspect, the change-over valve is a normal open valve, hydraulic pressure detecting means for the jack chamber in the hydraulic jack is provided, and the control means increases or reduces the holding current with respect to a closed position of the change-over valve according to an increase or a decrease in a pressure detected by the hydraulic pressure detecting means.

According to a fifth aspect of the present invention, in the first aspect, the change-over valve is a normal open valve, hydraulic pressure detecting means for the jack chamber in the hydraulic jack is provided, and the control means sets the holding current with respect to a closed position of the change-over valve such that the change-over valve is switched from the closed position to an open position when the pressure detected by the hydraulic pressure detecting means reaches preset blow pressure.

According to a sixth aspect of the present invention, in the first aspect, the change-over valve is a normal close valve, a permanent magnet for setting the change-over valve in an open position is provided, and the change-over valve is set in a closed position in accordance with the current application to the solenoid of the change-over valve.

First Aspect (a) After applying a startup current to the solenoid of the change-over valve to thereby switch an actuation position of the change-over valve, while switching an applied current to the solenoid to a holding current smaller than the startup current and holding the actuation position of the change-over valve, the control means intermittently applies a large current larger than the holding current to the solenoid.

Consequently, in starting up the solenoid of the change-over valve, the control means applies a fixed necessary startup current to the solenoid and surely starts up the solenoid. In holding the actuation position of the change-over valve after the startup, the control means applies the holding current smaller than the startup current to the solenoid to reduce a current consumption. Since holding power against vibration or the like acting on the change-over valve is weak with the small holding current, the control means intermittently applies the large current larger than the holding current to the solenoid to surely hold the switched actuation position of the change-over valve. Consequently, it is possible to eliminate the likelihood of heating and burnout of a coil of the solenoid and reduce a load on a battery.

Second Aspect (b) The control means integrates a current application time to the solenoid of the change-over valve and, when an integrated value of the current application time exceeds a fixed value, stops the current application to the solenoid.

Further, it is also possible to detect, with a current sensor, the electric current applied to the solenoid of the change-over valve and manage the applied current such that a heating value proportional to a product (i·t) of an electric current i and a current application time t does not exceed an allowable heating value.

A temperature sensor may be provided in the solenoid of the change-over valve to directly monitor the temperature of the solenoid (the temperature of the solenoid may be estimated from a detection result of an outdoor temperature sensor) and manage the applied current such that the temperature does not exceed allowable temperature.

(c) The control means integrates a current application time to the solenoid of the change-over valve or monitors the temperature of the solenoid and, when an integrated value of the current application time or the monitored temperature exceeds a fixed value, increases a time interval for intermittently applying the large current to the solenoid.

Consequently, it is possible to suppress the solenoid of the change-over valve from self-heating exceeding the allowable heating value and secure heat resistant toughness of the solenoid without stopping the current application to the solenoid.

Third Aspect (d) The control means monitors an applied current to the solenoid of the change-over valve and, when an abnormality of the applied current occurs, stops the current application to the solenoid.

Consequently, it is possible to prevent an excessively large abnormal current from being continuously applied to the solenoid of the change-over valve.

Fourth Aspect (e) The change-over valve is a normal open valve, hydraulic pressure detecting means for the jack chamber in the hydraulic jack is provided, and the control means increases or reduces the holding current to a closed position of the change-over valve according to an increase or a decrease in a pressure detected by the hydraulic pressure detecting means.

Consequently, when the solenoid of the change-over valve is turned on to hold the change-over valve in the closed position in a vehicle height increasing control mode or a vehicle height retaining mode in which the change-over valve functioning as the normal open valve is used, if the hydraulic pressure of the hydraulic jack increases, it is likely that holding power for holding an electromagnetic valve in the closed position is insufficient with the small holding current to the solenoid in (a). Therefore, the applied current to the solenoid is increased according to the increase in the hydraulic pressure to surely hold the change-over valve in the closed position. When the hydraulic pressure of the hydraulic jack changes to decrease, the applied current to the solenoid is reset to the small holding current.

Fifth Aspect (f) The change-over valve is a normal open valve, hydraulic pressure detecting means for the jack chamber in the hydraulic jack is provided, and the control means sets the holding current to a closed position of the change-over valve such that the change-over valve is switched from the closed position to an open position when a pressure detected by the hydraulic pressure detecting means reaches blow pressure set in advance.

Consequently, when the solenoid of the change-over valve is turned on to hold the change-over valve in the closed position in a vehicle height increasing control mode or a vehicle height retaining mode in which the change-over valve functioning as the normal open valve is used, by setting the holding current to the solenoid in (a) to the blow pressure of the hydraulic jack set in advance, it is possible to switch the change-over valve from the closed position to the open position and cause the change-over valve as a safety valve. For example, when an excessive current is input to the damper, it is possible to prevent breakage of the hydraulic jack with a simple configuration.

Sixth Aspect (g) The change-over valve is a normal close valve, a permanent magnet for setting the change-over valve in an open position is provided, and the change-over valve is set in a closed position according to the current application to the solenoid of the change-over valve.

Consequently, under a vehicle height reducing control mode in which the change-over valve functioning as the normal close valve is opened by the permanent magnet, when the solenoid of the change-over valve is turned on to start up the change-over valve or holds the change-over valve in the closed position and set in a vehicle height increasing control mode or a vehicle height retaining mode, if the solenoid generates an electromagnetic force enough for cancelling a magnetic force of the permanent magnet, the change-over valve is started up and held in the closed position with a force of a spring of the change-over valve. Therefore, an extremely small current is sufficient for the startup current and the holding current that should be applied to the solenoid.

BRIEF DESCRIPTION OF THE DRAWINGS

FIGS. 2A and 2B show a vehicle height increasing control mode of a rear suspension, wherein FIG. 2A is a sectional view showing an extension stroke and FIG. 2B is a sectional view showing a compression stroke;

FIGS. 5A and 5B show a vehicle height increasing control mode of a front fork, wherein FIG. 5A is a sectional view showing an extension stroke and FIG. 5B is a sectional view showing a compression stroke;

DESCRIPTION OF THE PREFERRED EMBODIMENT

Figure 1:
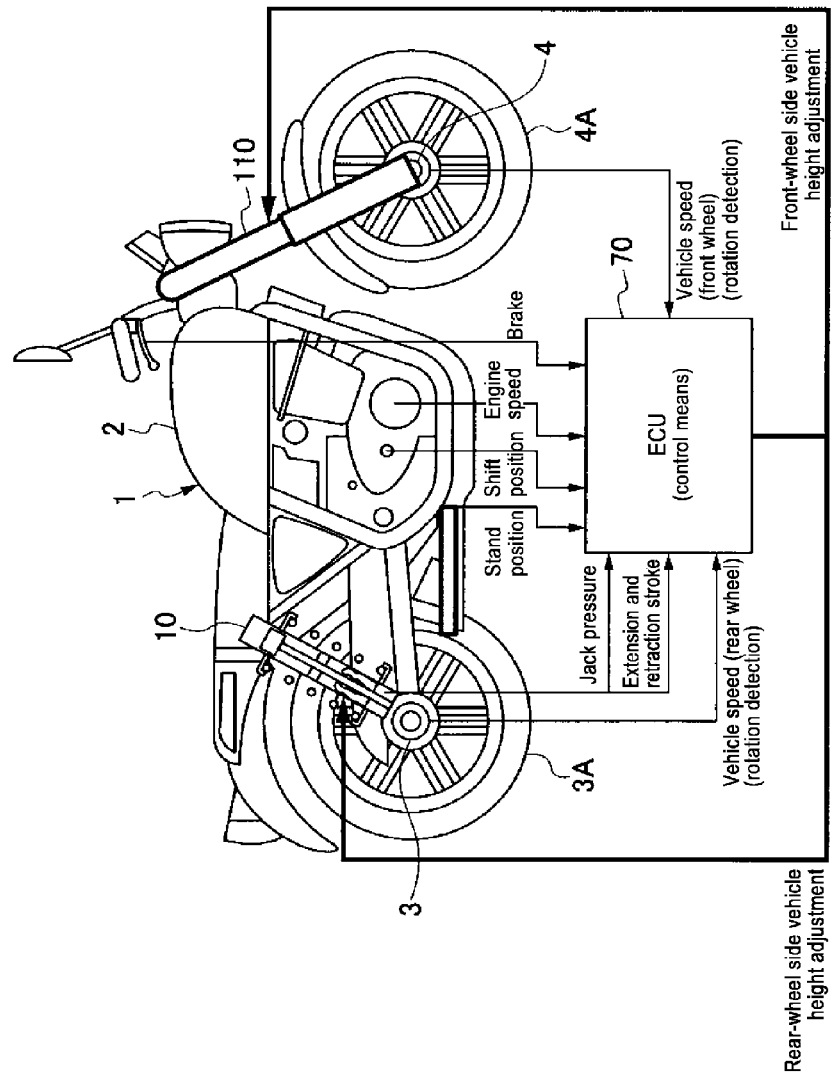
FIG. 1 is a schematic side view of a motorcycle.
Figure 2:
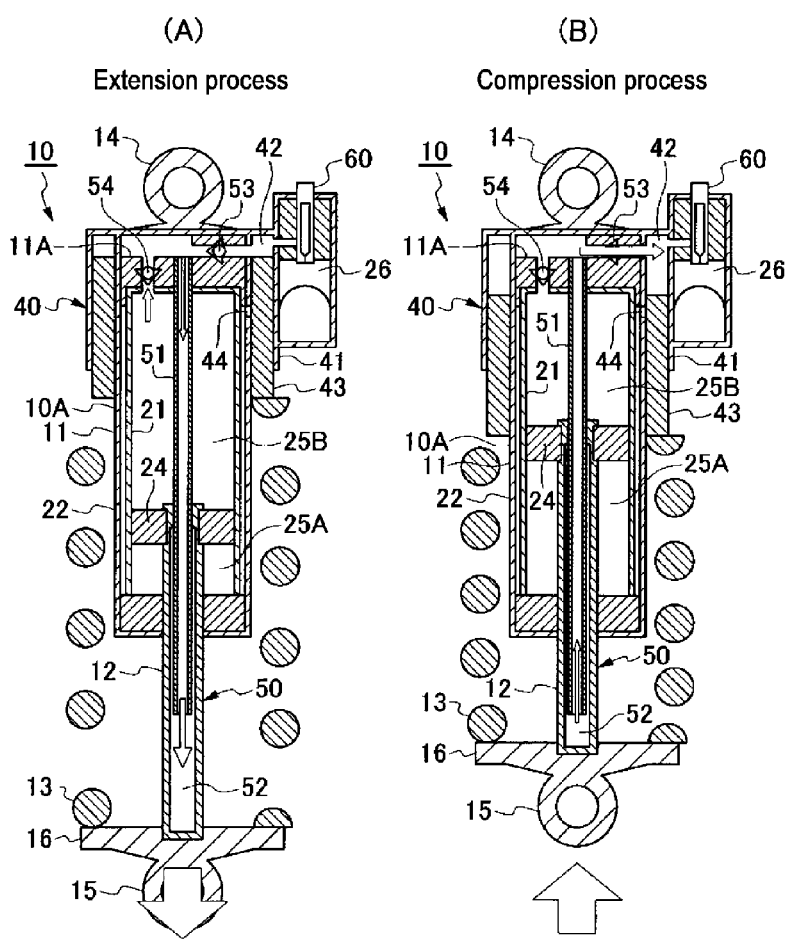

In a motorcycle 1 shown in FIG. 1, a rear suspension 10 is interposed between a vehicle body 2 and a rear axle 3 (a rear wheel 3A) and a front fork 110 is interposed between the vehicle body 2 and a front axle 4 (a front wheel 4A).

Rear suspension 10 (FIGS. 2A and 2B to FIG. 4, FIG. 8 and FIG. 9)

The rear suspension 10 includes a damper 10A shown in FIGS. 2A and 2B to FIG. 4 and FIG. 8. The damper 10A includes a damper tube 11 attached to the vehicle body side and a piston rod 12 attached to the axle side. The piston rod 12 slides in the damper tube 11 via a piston 24 and extends and retracts with respect to the damper tube 11. The piston rod 12 includes a suspension spring 13 arranged along the outer circumference of the damper tube 11 and the piston rod 12. A vehicle-body side attachment member 14 is fixed to the upper end portion of the damper tube 11. An axle side attachment member 15 is fixed to the lower end portion of the piston rod 12.

A hydraulic jack 41 of a rear-wheel side vehicle height adjusting device 40 is provided in an outer circumferential section on the upper end side of the damper tube 11. A plunger 43 that divides a jack chamber 42 is inserted into the hydraulic jack 41. The upper end of the suspension spring 13 is supported by the plunger 43. The lower end of the suspension spring 13 is supported by a spring bearing 16 provided in the axle side attachment member 15.

In the rear suspension 10, the damper tube 11 is a double tube including an inner tube 21 and an outer tube 22. The piston 24 is fixed to an insertion end of the piston rod 12 inserted into the inner tube 21. In the rear suspension 10, a lower oil chamber 25A and an upper oil chamber 25B divided by the piston 24 are formed on the inside of the inner tube 21. An oil reservoir chamber 26 is formed along the outer circumference of the outer tube 22. Hydraulic oil is stored in the oil chambers 25A and 25B and the oil reservoir chamber 26. The oil reservoir chamber 26 always communicates with the lower oil chamber 25A or the upper oil chamber 25B and compensates for the hydraulic oil equivalent to the volume of the piston rod 12 involved in the extension and retraction of the rear suspension 10.

The rear suspension 10 includes a damping force generating device 27 (FIG. 8) in a communication path between the lower oil chamber 25A and the upper oil chamber 25B provided in the piston 24 of the piston rod 12. The rear suspension 10 further includes a damping force generating device 28 (FIG. 8) in a communication path between the upper oil chamber 25B and the oil reservoir chamber 26 provided in the damper tube 11. The damping force generating devices 27 and 28 attenuate stretching vibration of the damper tube 11 and the piston rod 12 involved in absorption of an impact force from the road surface by the suspension spring 13.

In the rear-wheel side vehicle height adjusting device 40, as shown in FIGS. 2A and 2B to FIG. 4 and FIG. 8, the hydraulic jack 41 is provided in the outer circumference of the outer tube 22 in the damper tube 11. The hydraulic jack 41 includes the plunger 43 that divides the jack chamber 42. The plunger 43 is projected from the jack chamber 42 by the hydraulic oil supplied to the jack chamber 42. The upper end of the suspension spring 13 is supported on the lower surface of the plunger 43.

Figure 4:
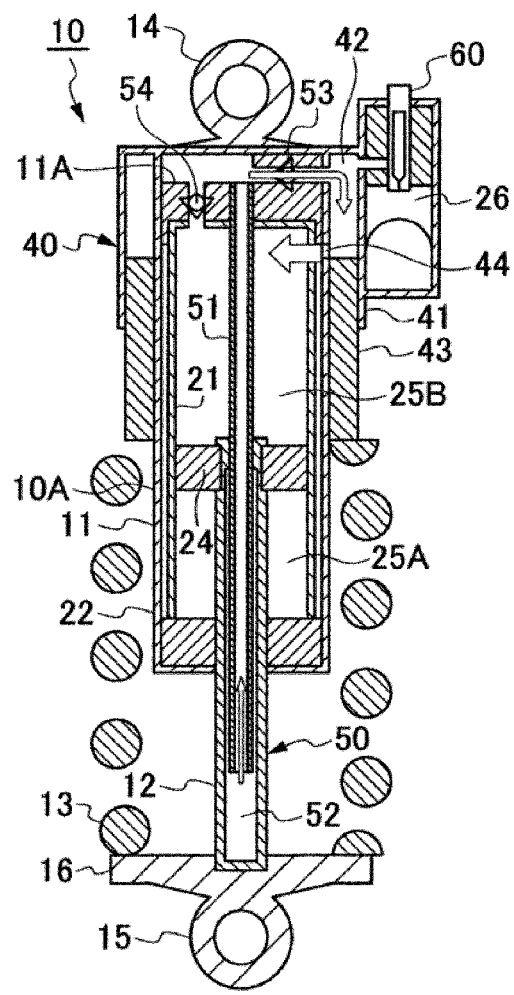
FIG. 4 is a sectional view showing a vehicle height retaining mode of the rear suspension.
Figure 5:
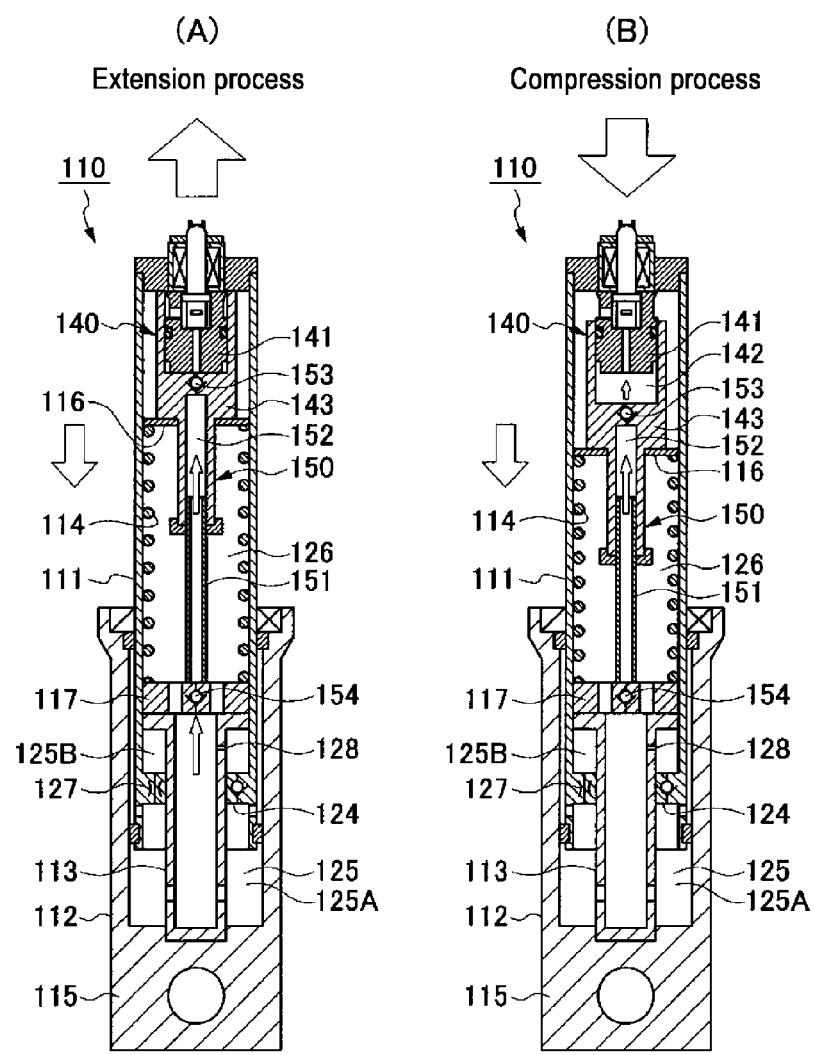

In the hydraulic jack 41, an oil return passage 44 for returning the hydraulic oil in the jack chamber 42 to the oil reservoir chamber 26 when the plunger 43 reaches a projection end of the projection from the jack chamber 42 is provided in the outer tube 22 (FIG. 4).

The rear-wheel side vehicle height adjusting device includes a hydraulic pump 50 configured to perform a pumping action according to the telescopic motion of the piston rod 12 with respect to the damper tube 11 and supply and discharge the hydraulic oil to and from the jack chamber 42 of the hydraulic jack 41.

In the hydraulic pump 50, a hollow pipe 51 vertically provided in an end piece 11A of the damper tube 11 is slidably inserted into a pump chamber 52 formed by a hollow section of the piston rod 12.

The hydraulic pump 50 includes a check valve for ejection 53 configured to eject, to the side of the hydraulic jack 41, the hydraulic oil in the pump chamber 52 pressurized by the retracting motion of the piston rod 12 entering the damper tube 11 and the hollow pipe 51 (FIG. 2B). The hydraulic pump 50 further includes a check valve for suction 54 configured to suck the hydraulic oil in the inner tube 21 of the damper tube 11 into the pump chamber 52 in which negative pressure is generated by the extending motion of the piston rod 12 exiting the damper tube 11 and the hollow pipe 51 (FIG. 2A).

Therefore, when the vehicle travels and the rear suspension 10 is vibrated by unevenness of the road surface, the hydraulic pump 50 performs the pumping action according to the telescopic motion of the piston rod 12 entering and exiting the damper tube 11 and the hollow pipe 51. When the pump chamber 52 is pressurized by the pumping action due to the retracting motion of the piston rod 12, the oil in the pump chamber 52 opens the check valve for ejection 53 to be ejected to the side of the hydraulic jack 41. When negative pressure is generated in the pump chamber 52 by the pumping action due to the extending motion of the piston rod 12, the oil in the upper oil chamber 25B of the damper tube 11 opens the check valve for suction 54 to be sucked into the pump chamber 52.

Figure 3:
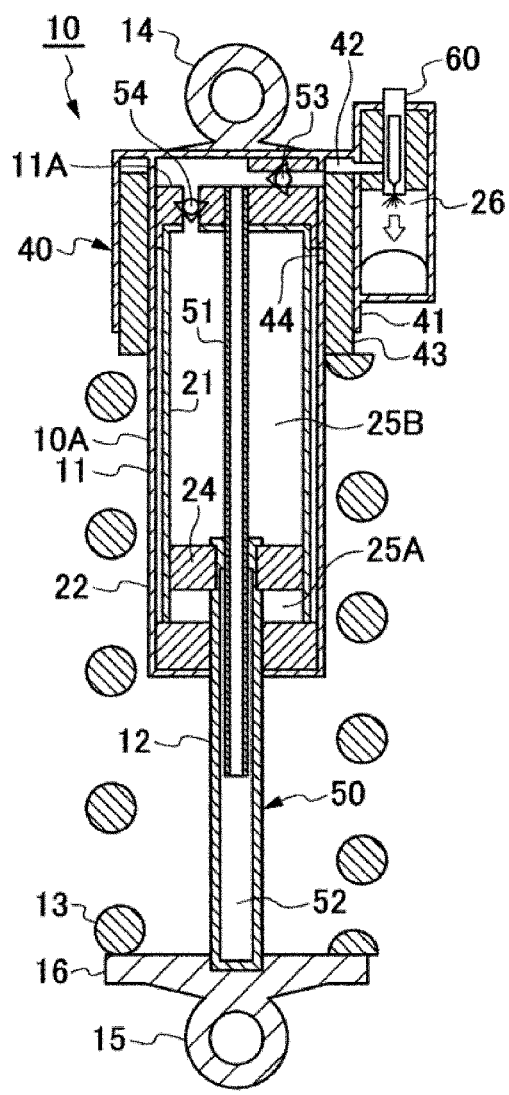
FIG. 3 is a sectional view showing a vehicle height reducing control mode of the rear suspension.

The rear-wheel side vehicle height adjusting device 40 includes an electromagnetic change-over valve 60 configured to switch and connect the jack chamber 42 of the hydraulic jack 41 and the oil reservoir chamber 26 of the damper 10A. The change-over valve 60 closes to stop the hydraulic oil supplied to the jack chamber 42 of the hydraulic jack 41 or opens to discharge the hydraulic oil to the oil reservoir chamber 26 (or the oil chambers 25A and 25B of the damper tube 11) as shown in FIG. 3.

Figure 8:
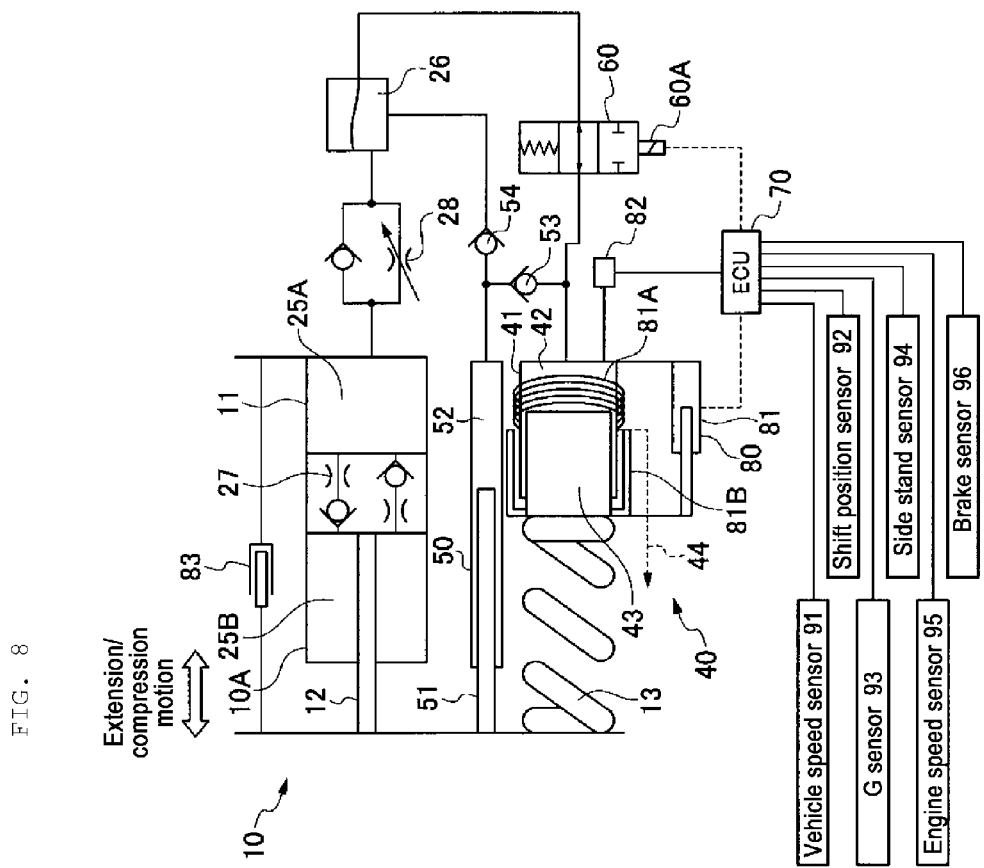
FIG. 8 is a control circuit diagram showing a vehicle height adjusting device.
Figure 9:
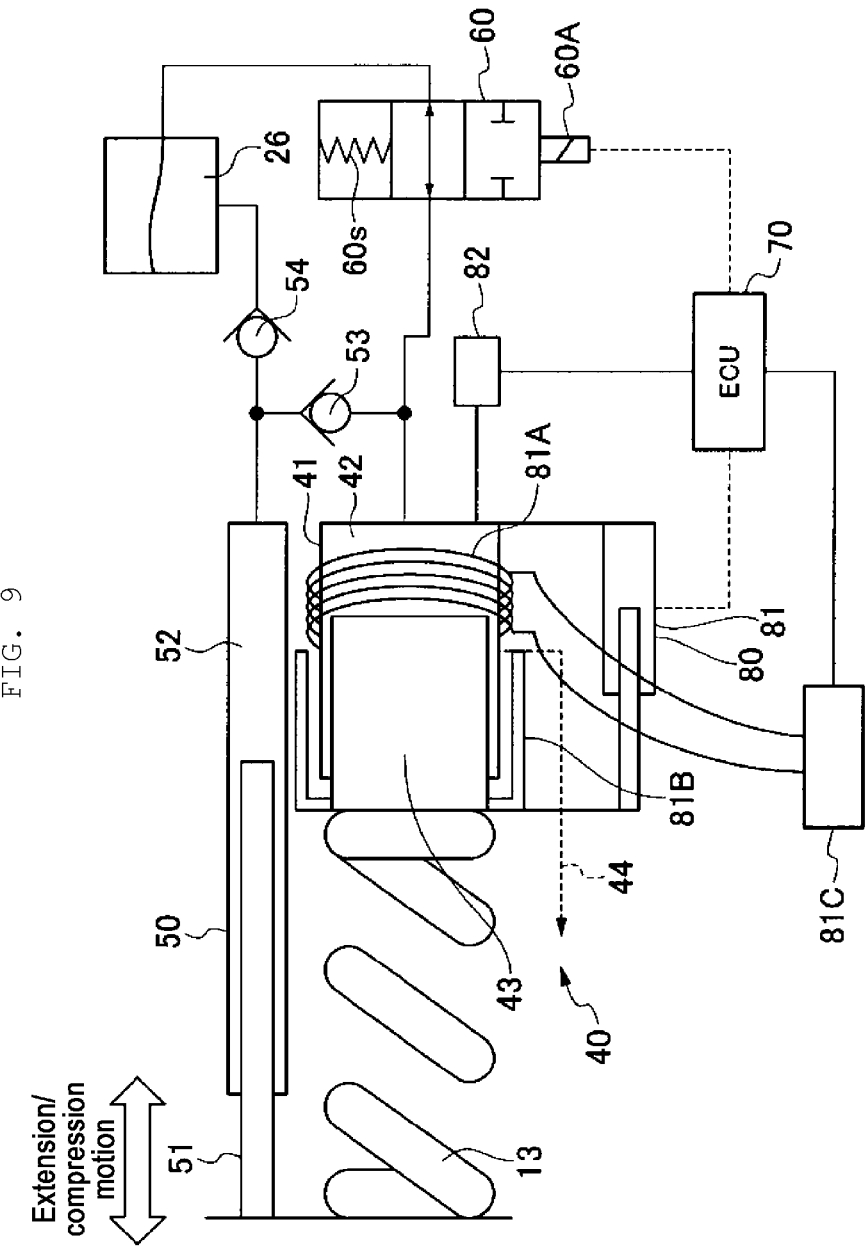
FIG. 9 is a circuit diagram showing an example of a control circuit.

The rear-wheel side vehicle height adjusting device includes a control circuit shown in FIG. 8 and FIG. 9 controlled by an ECU (control means) 70. The ECU 70 controls current application to a solenoid 60A of the change-over valve 60 and controls opening and closing of the change-over valve 60 to thereby adjust a liquid level of the hydraulic oil that is ejected oil supplied to and discharged from the jack chamber 42 of the hydraulic jack 41 by the hydraulic pump 50, which performs a pumping action according to the telescopic motion of the piston rod 12 with respect to the damper tube 11, and projecting height of the plunger 43 projecting from the jack chamber 42 and adjust the vehicle height of the vehicle.

Front Fork 110 (FIGS. 5A and 5B to FIG. 7)

As shown in FIGS. 5A and 5B to FIG. 7, the front fork 110 includes a damper 110A. The damper 110A includes a damper tube 111 attached to the vehicle body side and a bottom tube 112 and a piston rod 113 attached to the axle side. The damper tube 111 is slidably inserted into the bottom tube 112 from the upper end opening of the bottom tube 112. The piston rod 113 is vertically provided in the center on the inside of the bottom tube 112. The piston rod 113 slides in an oil chamber 125 on the lower end side of the damper tube 111 and extends and retracts with respect to the damper tube 111. A suspension spring 114 is arranged in an oil reservoir chamber 126 on the upper end side of the damper tube 111. A not-shown vehicle-body side attachment member is fixed to the upper end portion of the damper tube 111. An axle side attachment member 115 is fixed to the lower end portion of the bottom tube 112.

A hydraulic jack 141 of the front-wheel side vehicle height adjusting device 140 is provided at the upper end portion of the damper tube 111. A plunger 143 that divides the jack chamber 142 is fit in the hydraulic jack 141. The upper end of the suspension spring 114 is supported by the plunger 143 via a spring bearing 116. The lower end of the suspension spring 114 is supported by an end piece and spring bearing 117 provided at the upper end of the piston rod 113.

The front fork 110 fixedly includes, on the lower end side of the damper tube 111, a piston 124 configured to slide along the outer circumference of the piston rod 113. In the front fork 110, a lower oil chamber 125A and an upper oil chamber 125B divided by the piston 124 are formed along the outer circumference of the piston rod 113. An oil reservoir chamber 126 is formed along the inner circumference of the piston rod 113 and the upper inner circumference of the damper tube 111. The hydraulic oil is stored in the oil chambers 125A and 125B and the oil reservoir chamber 126. The oil reservoir chamber 126 always communicates with the lower oil chamber 125A or the upper oil chamber 125B and compensates for the hydraulic oil equivalent to the volume of the damper tube 111 involved in the extension and retraction of the front fork 110.

The front fork 110 includes a damping force generating device 127 in a communication path between the lower oil chamber 125A and the upper oil chamber 125B provided in the piston 124 of the damper tube 111. The front fork 110 further includes a damping force generating device 128 in a communication path between the lower and upper oil chambers 125A and 125B and the oil reservoir chamber 126 provided in the piston rod 113. The damping force generating devices 127 and 128 attenuate stretching vibration of the damper tube 111, the bottom tube 112, and the piston rod 113 involved in absorption of an impact force from the road surface by the suspension spring 114.

In the front-wheel side vehicle height adjusting device 140, as shown in FIGS. 5A and 5B to FIG. 7, the hydraulic jack 141 is provided at the upper end portion of the damper tube 111. The hydraulic jack 141 includes the plunger 143 that divides the jack chamber 142. The plunger 143 is projected from the jack chamber 142 by the hydraulic oil supplied to the jack chamber 142. The upper end of the suspension spring 114 is supported on the lower surface of the plunger 143.

Figure 7:
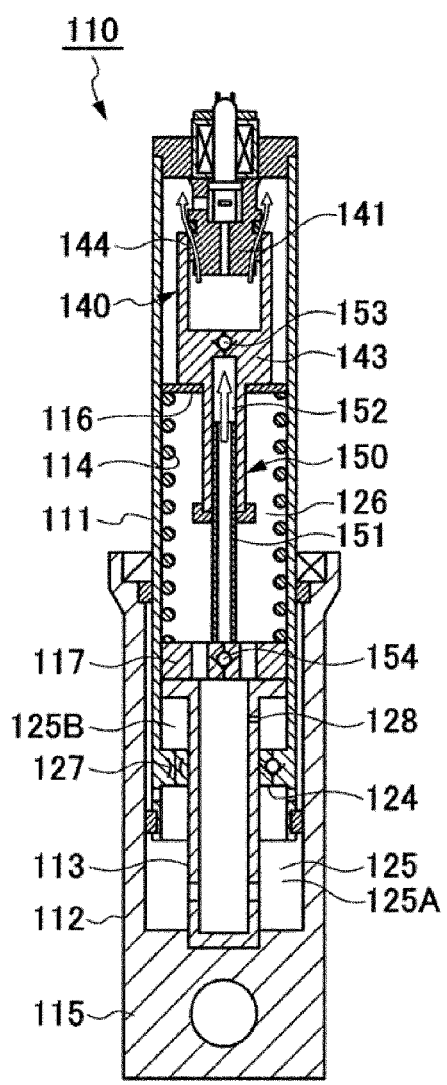
FIG. 7 is a sectional view showing a vehicle height retaining mode of the front fork.

In the hydraulic jack 141, an oil return passage 144 for returning the hydraulic oil in the jack chamber 142 to the oil reservoir chamber 126 when the plunger 143 reaches a projection end of the plunger 143 projected from the jack chamber 142 is provided in the hydraulic jack 141 (FIG. 7).

The front-wheel side vehicle height adjusting device 140 includes a hydraulic pump 150 configured to perform a pumping action according to the telescopic motion of the piston rod 113 with respect to the damper tube 111 and supply and discharge the hydraulic oil to and from the jack chamber 142 of the hydraulic jack 141.

In the hydraulic pump 150, a hollow pipe 151 vertically provided in the end piece 117 of the piston rod 113 is slidably inserted into a pump chamber 152 formed by a hollow section of the plunger 143.

The hydraulic pump 150 includes a check valve for ejection 153 configured to eject, to the side of the hydraulic jack 141, the hydraulic oil in the pump chamber 152 pressurized by the retracting motion of the piston rod 113 and the hollow pipe 151 entering the damper tube 111 (FIG. 5B). The hydraulic pump 150 further includes a check valve for suction 154 configured to suck the hydraulic oil in the oil reservoir chamber 126 into the pump chamber 152 in which negative pressure is generated by the extending motion of the piston rod 113 and the hollow pipe 151 exiting the damper tube 111 (FIG. 5A).

Therefore, when the vehicle travels and the front fork 110 is vibrated by unevenness of the road surface, the hydraulic pump 150 performs the pumping action according to the telescopic motion of the piston rod 113 and the hollow pipe 151 entering and exiting the damper tube 111. When the pump chamber 152 is pressurized by the pumping action due to the retracting motion of the piston rod 113, the oil in the pump chamber 152 opens the check valve for ejection 153 to be ejected to the side of the hydraulic jack 141. When negative pressure is generated in the pump chamber 152 by the pumping action due to the extending motion of the piston rod 113, the oil in the oil reservoir chamber 126 opens the check valve for suction 154 to be sucked into the pump chamber 152.

Figure 6:
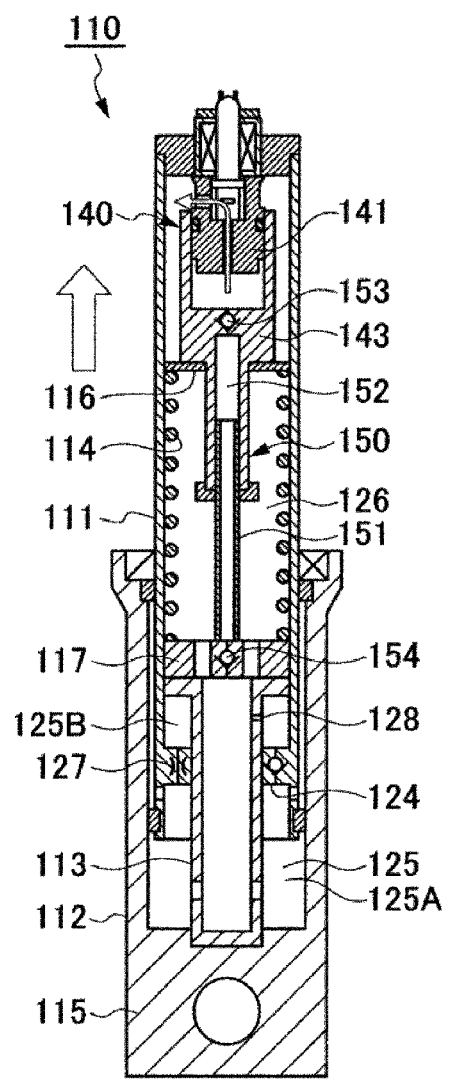
FIG. 6 is a sectional view showing a vehicle height reducing control mode of the front fork.

The front-wheel side vehicle height adjusting device 140 includes an electromagnetic change-over valve 160 (not shown in the figures) configured to switch and connect the jack chamber 142 of the hydraulic jack 141 and the oil reservoir chamber 126 of the damper 110A. The change-over valve 160 closes to stop the hydraulic oil supplied to the jack chamber 142 of the hydraulic jack 141 or opens to discharge the hydraulic oil to the oil reservoir chamber 126 as shown in FIG. 6.

The front-wheel side vehicle height adjusting device 140 includes a control circuit same as the control circuit shown in FIG. 8 and FIG. 9 controlled by the ECU 70 in the rear-wheel side vehicle height adjusting device 40. The ECU 70 controls current application to a solenoid 160A (not shown in the figures) of the change-over valve 160 and controls opening and closing of the change-over valve 160 to thereby adjust a liquid level of the hydraulic oil that is ejected oil supplied to and discharged from the jack chamber 142 of the hydraulic jack 141 by the hydraulic pump 150, which performs a pumping action according to the telescopic motion of the piston rod 113 with respect to the damper tube 111, and projecting height of the plunger 143 projecting from the jack chamber 142 and adjust the vehicle height of the vehicle.

The ECU 70 in this embodiment obtains detection signals of vehicle height detecting means 80 (front-wheel side vehicle height detecting means 80F and rear-wheel side vehicle height detecting means 80R), a vehicle speed sensor 91 (a front vehicle speed sensor 91F and a rear wheel vehicle speed sensor 91R), a shift position sensor 92, a G sensor (acceleration sensor) 93, a side stand sensor 94, an engine speed sensor 95, a brake sensor 96, and the like and subjects the change-over valve 60 (or the change-over valve 160) configured by an electromagnetic valve to ON/OFF control.

As the vehicle height detecting means 80 (the front-wheel side vehicle height detecting means 80F or the rear-wheel side vehicle height detecting means 80R), one of projection height detecting means 81 for the plunger 43 in the hydraulic jack 41 (or the plunger 143 in the hydraulic jack 141), hydraulic pressure detecting means 82 for the jack chamber 42 in the hydraulic jack 41 (or the jack chamber 142 in the hydraulic jack 141), and extension and retraction stroke length detecting means 83 for the piston rod 12 with respect to the damper tube 11 (or the piston rod 113 with respect to the damper tube 111) or a combination of two or more of those components can be adopted.

In the projection height detecting means 81 for the plunger 43, specifically, for example, as shown in FIG. 8, a coil 81A is wound around the outer circumference of the hydraulic jack 41 and the outer circumference of the hydraulic jack 41 is covered with a cover 81B provided in the plunger 43. The projection height detecting means 81 changes the impedance of the coil 81A according to the displacement of the plunger 43. An output of the coil 81A is transmitted to the ECU 70 via a signal processing circuit 81C. The ECU 70 detects the projection height of the plunger 43 according to an oscillation frequency of the coil 81A output by the signal processing circuit 81C.

Concerning a vehicle height adjusting operation for the motorcycle 1, the rear-wheel side vehicle height adjusting device 40 of the rear suspension 10 employing the control circuit shown in FIG. 8 and FIG. 9 including the change-over valve 60 configured by a single two-port two-position electromagnetic valve is explained in detail. A vehicle height adjusting operation by the front-wheel side vehicle height adjusting device 140 of the front fork 110 is substantially the same. The change-over valve 60 shown in FIG. 8 and FIG. 9 is a normal open valve (however, the change-over valve 60 may be a normal close valve).

In a vehicle height reducing control mode in which the ECU 70 outputs an OFF signal, the change-over valve 60 opens to connect the jack chamber 42 of the hydraulic jack 41 to the oil reservoir chamber 26 of the damper tube 11. Therefore, the hydraulic pump 50 discharges the hydraulic oil supplied to the jack chamber 42 of the hydraulic jack 41 to the oil reservoir chamber 26 to reduce the liquid level of the jack chamber 42 and the projection height of the plunger 43 to enable a vehicle height reducing operation.

On the other hand, in a vehicle height increasing control mode in which the ECU 70 outputs an ON signal, the change-over valve 60 closes to shut off the jack chamber 42 of the hydraulic jack 41 from the oil reservoir chamber 26 of the damper tube 11. Therefore, the hydraulic pump 50 does not discharge the hydraulic oil supplied to the jack chamber 42 of the hydraulic jack 41 to enable a vehicle height maintaining or vehicle height increasing operation. At this point, according to the pumping action due to the extending motion of the piston rod 12, the hydraulic pump 50 enables the oil in the lower oil chamber 25A of the damper tube 11 to be sucked into the pump chamber 52 from the check valve for suction 54. According to the pumping action due to the retracting motion of the piston rod 12, the hydraulic pump 50 supplies the oil in the pump chamber 52 to the jack chamber 42 of the hydraulic jack 41 from the check valve for discharge 53 to enable the vehicle height increasing operation.

Specifically, control modes by the rear-wheel side vehicle height adjusting device 40 are as explained below.

(A) Vehicle Height Reducing Control Mode

In the rear-wheel side vehicle height adjusting device 40, during traveling or during a long-time stop of the vehicle, the ECU 70 shifts to the vehicle height reducing control mode for opening the change-over valve 60 according to any one of control conditions 1 to 3 explained below under the vehicle height increasing control mode for closing the change-over valve 60 to enable the vehicle height increasing operation.

1. Vehicle Speed Control

When vehicle speed V of the vehicle is equal to or lower than vehicle height vehicle speed Vd (V≤Vd), the ECU 70 enters the vehicle height reducing control mode and opens the change-over valve 60 to enable the vehicle height reducing operation.

The ECU 70 sets the vehicle height reducing speed Vd in advance. Vd is, for example, 10 km/h.

2. Stop Prediction Time Control

The ECU 70 predicts a stop prediction time T of the vehicle. When the predicted stop prediction time T is equal to or smaller than a predetermined reference stop time Ta (T≤Ta), the ECU 70 enters the vehicle height reducing control mode and opens the change-over valve 60 to enable the vehicle height reducing operation.

The ECU 70 calculates deceleration from the vehicle speed of the vehicle or detects deceleration from the G sensor and predicts the stop prediction time T from the deceleration.

The ECU 70 sets the reference stop time Ta as a discharge time for the hydraulic oil filled in the jack chamber 42 of the hydraulic jack 41 (time for discharging the hydraulic oil from the jack chamber 42 to the oil reservoir chamber 26 of the damper tube 11 via the change-over valve 60).

At this point, the ECU 70 sets in advance reference vehicle speed Va at which the prediction of the stop prediction time T should be started. When the vehicle speed V of the vehicle is equal to or lower than the reference vehicle speed Va (V≤Va), the ECU 70 predicts the stop prediction time T.

In the stop prediction time control, instead of the control conditions T≤Ta and V≤Va, when deceleration α of the vehicle is equal to or higher than predetermined reference deceleration αa (α≥αa), the ECU 70 may enter the vehicle height reducing control mode and open the change-over valve 60 to enable the vehicle height reducing operation.

The ECU 70 sets the reference vehicle speed Va, the reference stop time Ta, and the reference acceleration αa in advance. Va is, for example, 40 km/h, Ta is, for example, 2.5 sec, and αa is, for example, 4 km/h/sec.

The stop prediction time is a parameter representing time when the traveling vehicle stops in the nearest future predicted and calculated from a vehicle motion parameter at every moment. The stop prediction time has a dimension of time.

When an actual comparison operation is preformed, the comparison operation could be a comparison operation that seemingly does not calculate an order of "time" because, for example, the dimension of time is divided to both sides of a comparison expression or comparison is performed for each element.

For example, one of most simple arithmetic expressions for the stop prediction time is $T=-v/\alpha=-V\cdot dt/dV$ (an arithmetic expression assuming uniformly accelerated motion). All three comparison expressions below have the same meaning. Even if a difference in a comparing method occurs due to convenience of calculation, in actual meaning, a comparison operation for the stop prediction time is performed.

$$T<c (c \text{ is a threshold}, c=Ta)$$

$$V<-c\cdot\alpha$$

$$-\alpha>c\cdot V$$

In an example in which the comparison is performed for each element, for example, comparison is performed for each of elements V and α for calculating the stop prediction time as in $(V<c1)\cup(-\alpha>c2)$ (c1 and c2 are thresholds) and AND is calculated.

In this case, from $T=-V/\alpha$, Ta can be represented as $Ta=(-c1)/(-c2)=c1/c2$.

3. Side Stand Control

When it is detected that the side stand of the vehicle is changed from a standby position to a work position, the ECU 70 enters the vehicle height reducing control mode and opens the change-over valve 60 to enable the vehicle height reducing operation. The ECU 70 monitors vehicle speed. The ECU 70 can perform, for example, control for not performing, when the vehicle speed is equal to or higher than very low speed (e.g., 5 km/s), the reducing control even if the stand position is the work position and carrying out the reducing control only when the vehicle speed is 0.

(B) Vehicle Height Increasing Control Mode

In the rear-wheel side vehicle height adjusting device 40, the ECU 70 shifts to the vehicle height increasing control mode for closing the change-over valve 60 according to any one of control conditions 1 to 4 explained below during the vehicle height reducing control mode in which the change-over valve 60 is opened and retained according to (A) above.

When the ECU 70 enters the vehicle height increasing control mode and closes the change-over valve 60 from the open state, the ECU 70 turns off the applied voltage E0 to the change-over valve 60 (E0=0V).

1. Vehicle Speed Control

When the vehicle speed V of the vehicle exceeds the vehicle height reducing vehicle speed Vd (or vehicle height increasing vehicle speed Vu set independently from the vehicle height reducing vehicle speed Vd) (V>Vd or V>Vu), the ECU 70 suspends the vehicle height reducing control mode, enters the vehicle height increasing control mode, and closes the change-over valve 60 to enable the vehicle height increasing operation.

The ECU 70 sets the vehicle height reducing vehicle speed Vd (or the vehicle height increasing vehicle speed Vu) in advance. Vd or Vu is, for example, 40 km/h.

2. Stop Prediction Time Control

The ECU 70 predicts the stop prediction time T of the vehicle and, when the predicted stop prediction time T exceeds a predetermined secondary reference stop time Tb (T>Tb), suspends the vehicle height reducing control mode, enters the vehicle height increasing control mode, and closes the change-over valve 60 to enable the vehicle height increasing operation.

The ECU 70 predicts the stop prediction time T of the vehicle from deceleration (or acceleration) of the vehicle.

At this point, the ECU 70 sets in advance secondary reference vehicle speed Vb at which prediction of the stop time T of the vehicle should be started and, when the vehicle speed V of the vehicle exceeds the secondary reference vehicle speed Vb (V>Vb), predicts the stop prediction time T.

In the stop prediction time control, instead of the control conditions T>Tb and V>Vb explained above, when acceleration β of the vehicle exceeds predetermined reference acceleration βb (β>βb), the ECU 70 may suspend the vehicle height reducing control mode, enter the vehicle speed increasing control mode, open the change-over valve 60 to enable the vehicle height increasing operation.

The ECU 70 sets the secondary reference vehicle speed Vb, the secondary reference stop time Tb, and the reference acceleration βb in advance. Vb is, for example, 40 km/h, Tb is, for example, 3 sec, and βb is, for example, 5 km/h/sec.

3. Long-Time Stop Control

When a stop time of the vehicle is equal to longer than predetermined continuous stop time Tc, the ECU 70 suspends the vehicle height reducing control mode, enters the vehicle height increasing control mode, closes the change-over valve 60 to enable the vehicle height increasing operation.

The ECU 70 sets the continuous stop time Tc of the vehicle in advance. Tc is, for example, 30 sec.

4. Neutral Control

When the vehicle speed V of the vehicle is 0 and a shift position of the transmission is neutral, the ECU 70 suspends the vehicle height reducing control mode, enters the vehicle height increasing control mode, and closes the change-over valve 60 to enable the vehicle height increasing operation.

(C) Vehicle Height Retaining Mode

In the rear-wheel side vehicle height adjusting device 40, during traveling of the vehicle, the ECU 70 subjects the change-over valve 60 to opening and closing control according to a detection result of the vehicle height detecting means 80 (the rear-wheel side vehicle height detecting means 80R) to thereby retain the vehicle height at an arbitrary intermediate height position desirably set in advance.

That is, an upper threshold of vehicle height at which the ECU 70 switches the change-over valve 60 from ON operation (the vehicle height increasing control mode) to OFF operation to open the change-over valve 60 and starts vehicle height reduction is set to H1. A lower threshold of the vehicle height at which the ECU 70 switches the change-over valve 60 from the OFF operation (the vehicle height reducing control mode) to the ON operation to close the change-over valve 60 and starts vehicle height increase is set to H2. Consequently, the ECU 70 retains, according to a detection result of the vehicle height detecting means 80, the vehicle height during traveling of the motorcycle 1 in an intermediate height position between H1 and H2.

Therefore, with the rear-wheel side vehicle height adjusting device 40, the vehicle height can be retained in an arbitrary intermediate height position between a maximum height position set by a maximum projectable end of the plunger 43 in the hydraulic jack 41 and a minimum height position set by a minimum retractable end of the plunger 43 in the hydraulic jack 41.

It is possible to instantaneously switch the vehicle height by adopting an electromagnetic valve as the change-over valve 60 functioning as switching means for the vehicle height.

It is possible to estimate vehicle height during detection by adopting the projection height detecting means 81 for the plunger 43 in the hydraulic jack 41 as the vehicle height detecting means 80 (the rear-wheel side vehicle height detecting means 80R).

It is possible to estimate vehicle height during detection by adopting the hydraulic pressure detecting means 82 for the jack chamber 42 in the hydraulic jack 41 as the vehicle height detecting means 80 (the rear-wheel side vehicle height detecting means 80R). Then, it is possible to estimate vehicle weight (movable load) by filtering (low pass) a detection result of the hydraulic pressure detecting means 82. When the vehicle weight is large and the vehicle height tends to be low, the vehicle height is increased to avoid bottoming of the damper 10A. When the vehicle weight is small and the vehicle height tends to be high, the vehicle height is reduced to avoid stretching of the damper 10A.

It is possible to estimate vehicle height during detection by adopting the extension and retraction stroke length detecting means 83 for the piston rod 12 with respect to the damper tube 11 as the vehicle height detecting means 80 (the rear-wheel sided vehicle height detecting means 80R). Then, it is possible to estimate an unevenness state (an amplitude state) of the road surface by filtering (band pass) a detection result of the extension and retraction stroke length detecting means 83. When the amplitude of the road surface is large, the vehicle height is increased to avoid bottoming of the damper 10A or the vehicle height is adjusted to appropriate height to avoid both bottoming and stretching of the damper 10A. When the amplitude of the road surface is small, the vehicle height is reduced to ease the resistance of wind if the vehicle is an on-road vehicle or the vehicle height is reduced to prevent back-and-forth pitching of the vehicle if the vehicle is an off-road vehicle.

A current application control method for, in order to switch and hold an actuation position (an open position and a closed position) of the change-over valve 60, reducing consumption of an electric current applied to the solenoid 60A of the change-over valve 60 and surely holding the actuation position is explained below. A current application control method for the solenoid 160A of the change-over valve 160 is substantially the same.

Figure 10:
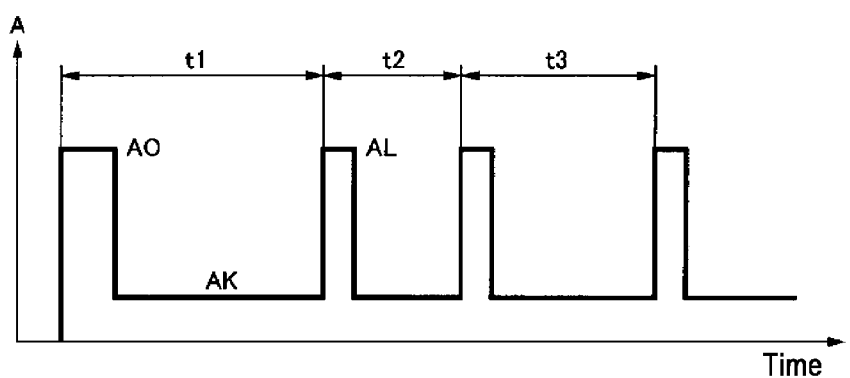
FIG. 10 is a diagram showing an applied current to a solenoid of a change-over valve.

(I) Current Application Method 1 (FIG. 10)

As shown in FIG. 10, after switching an actuation position of the change-over valve 60 to an ON position (a closed position) by applying a startup current A0 (a rated current) to the solenoid 60A of the change-over valve 60, the ECU 70 switches an applied current A to the solenoid 60A to a holding current AK smaller than the startup current A0 and holds the actuation position of the change-over valve 60 in the ON position (the closed position). While holding the actuation position of the change-over valve 60 in the ON position (the closed position), the ECU 70 applies a large current AL (AL may be A0) larger than the holding current AK to the solenoid 60A intermittently, i.e., at a fixed time interval ti (t1, t2, t3, etc., t1, t2, and t3 may be equal).

Consequently, when the solenoid 60A of the change-over valve 60 is started up, the ECU 70 applies a fixed necessary startup current A0 to the solenoid 60A to surely start up the solenoid 60A. When the actuation position of the change-over valve 60 is held after the startup, the ECU 70 applies the holding current AK smaller than the startup current A0 to the solenoid 60A to reduce current consumption. Since holding power against vibration or the like acting on the change-over valve 60 is weak with the small holding current AK, the ECU 70 intermittently applies the large current AL larger than the holding current AK to the solenoid 60A to surely hold the switched actuation position of the change-over valve 60. Consequently, it is possible to eliminate the likelihood of heating and burnout of the coil of the solenoid 60A and reduce a load on the battery.

(II) Current Application Control Method 2

After applying an electric current to the solenoid 60A of the change-over valve 60 and switching the actuation position of the change-over valve 60 to the ON position (the closed position), the ECU 70 integrates a current application time to the solenoid 60A and, when an integrated value of the current application time exceeds a fixed value, estimates that a heating value of the solenoid 60A exceeds an allowable heating value and stops the current application to the solenoid 60A.

Further, the ECU 70 detects, with a current sensor, the electric current applied to the solenoid 60A of the change-over valve 60 and manages the applied current such that a heating value proportional to a product (i·t) of an electric current i and a current application time t does not exceed the allowable heating value.

A temperature sensor may be provided in the solenoid 60A of the change-over valve 60 to directly monitor the temperature of the solenoid 60A (the temperature of the solenoid 60A may be estimated from a detection result of an outdoor temperature sensor) and manage the applied current such that the temperature does not exceed allowable temperature.

(III) Current Application Method 3

After applying an electric current to the solenoid 60A of the change-over valve 60 and switching the actuation position of the change-over valve 60 to the ON position (the closed position), as in (II) above, the ECU 70 integrates a current application time to the solenoid 60A or monitors the temperature of the solenoid 60A and, when an integrated value of the current application time or the monitored temperature exceeds a fixed value, increases a time interval ti for intermittently applying the large current AL in (I) above to the solenoid 60A.

Consequently, it is possible to suppress the solenoid 60A of the change-over valve 60 from self-heating exceeding the allowable heating value and secure heat resistant toughness of the solenoid 60A without stopping the current application to the solenoid 60A.

Figure 12:
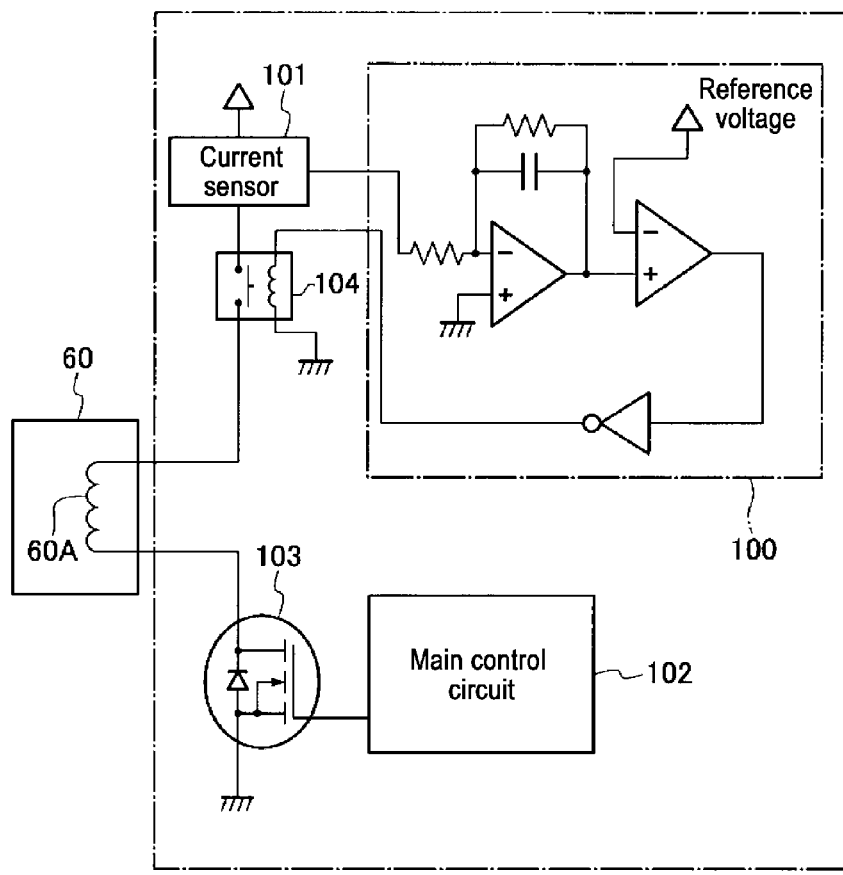
FIG. 12 is a schematic diagram showing a current monitoring circuit for the solenoid of the change-over valve.

(IV) Current Application Control Method 4 (FIG. 12)

The ECU 70 monitors the applied current to the solenoid 60A of the change-over valve 60 with a current monitoring circuit 100 shown in FIG. 12 and, when an abnormality of the applied current occurs, stops the current application to the solenoid 60A.

The current monitoring circuit 100 monitors the current sensor 101 that always detects an electric current of the solenoid 60A. When an abnormality in which a large current continues to flow to the solenoid 60A occurs, the current monitoring circuit 100 determines that a power supply switch 103 or the like for the solenoid 60A by a main control circuit 102 is broken down, turns off a relay of a holding switch 104, and stops the current application to the solenoid 60A.

Consequently, it is possible to prevent an excessively large abnormal current from being continuously applied to the solenoid 60A of the change-over valve 60.

Figure 11:
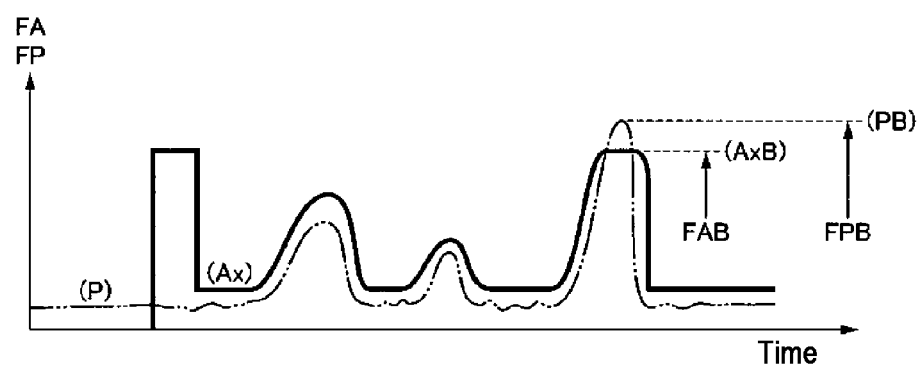
FIG. 11 is a diagram showing a relation between an electromagnetic force generated in the solenoid of the change-over valve and hydraulic pressure of a hydraulic jack.

(V) Current Application Control Method 5 (FIG. 11)

When the change-over valve 60 is the normal open valve, as shown in FIG. 11, the ECU 70 obtains a pressure P detected by the hydraulic pressure detecting means 82 of the jack chamber 42 in the hydraulic jack 41 and increases or reduces a holding current Ax applied to the solenoid 60A to hold the change-over valve 60 in the closed position according to an increase or a decrease in the pressure P detected. The ECU 70 controls an electromagnetic force FA generated by the holding current Ax applied to the solenoid 60A to exceed a moving force FP of the change-over valve 60 (a force due to an urging force of a spring 60s of the change-over valve 60 and the pressure P).

Consequently, when the solenoid 60A of the change-over valve 60 is turned on to hold the change-over valve 60 in the closed position in the vehicle height increasing control mode or the vehicle height retaining mode in which the change-over valve 60 functioning as the normal open valve is used, if the hydraulic pressure of the hydraulic jack 41 increases, it is likely that holding power for holding an electromagnetic valve in the closed position is insufficient with the small holding current AK to the solenoid 60A in (I) above. Therefore, the applied current Ax to the solenoid 60A is increased according to the increase in the hydraulic pressure to surely hold the change-over valve 60 in the closed position. When the hydraulic pressure of the hydraulic jack 41 changes to decrease, the applied current to the solenoid 60A is reset to the small holding current AK.

(VI) Current Application Control Method 6 (FIG. 11)

When the change-over valve 60 is the normal open valve, as shown in FIG. 11, the ECU 70 obtains the pressure P detected by the hydraulic pressure detecting means 82 of the jack chamber 42 in the hydraulic jack 41 and, when the pressure P detected reaches a blow pressure PB of the hydraulic jack 41 set in advance, sets a holding current A×B to the closed position of the change-over valve 60 such that the change-over valve 60 is switched from the closed position to the open position. That is, the ECU 70 controls a moving force FPB of the change-over valve 60 subjected to the blow pressure PB of the hydraulic jack 41 (a force due to a spring force of the spring 60s of the change-over valve 60 and the blow pressure PB) to exceed an electromagnetic force FAB generated by the holding current A×B applied to the solenoid 60A.

Consequently, when the solenoid 60A of the change-over valve 60 is turned on to hold the change-over valve 60 in the closed position in the vehicle height increasing control mode or the vehicle height retaining mode in which the change-over valve 60 functioning as the normal open valve is used, the holding current A×B to the solenoid 60A in (I) above is set to the blow pressure PB of the hydraulic jack 41 set in advance, whereby it is possible to switch the change-over valve 60 from the closed position to the open position and cause the change-over valve 60 as a safety valve. For example, when an excessive current is input to the damper 10A, it is possible to prevent breakage of the hydraulic jack 41 with a simple configuration.

Figure 13:
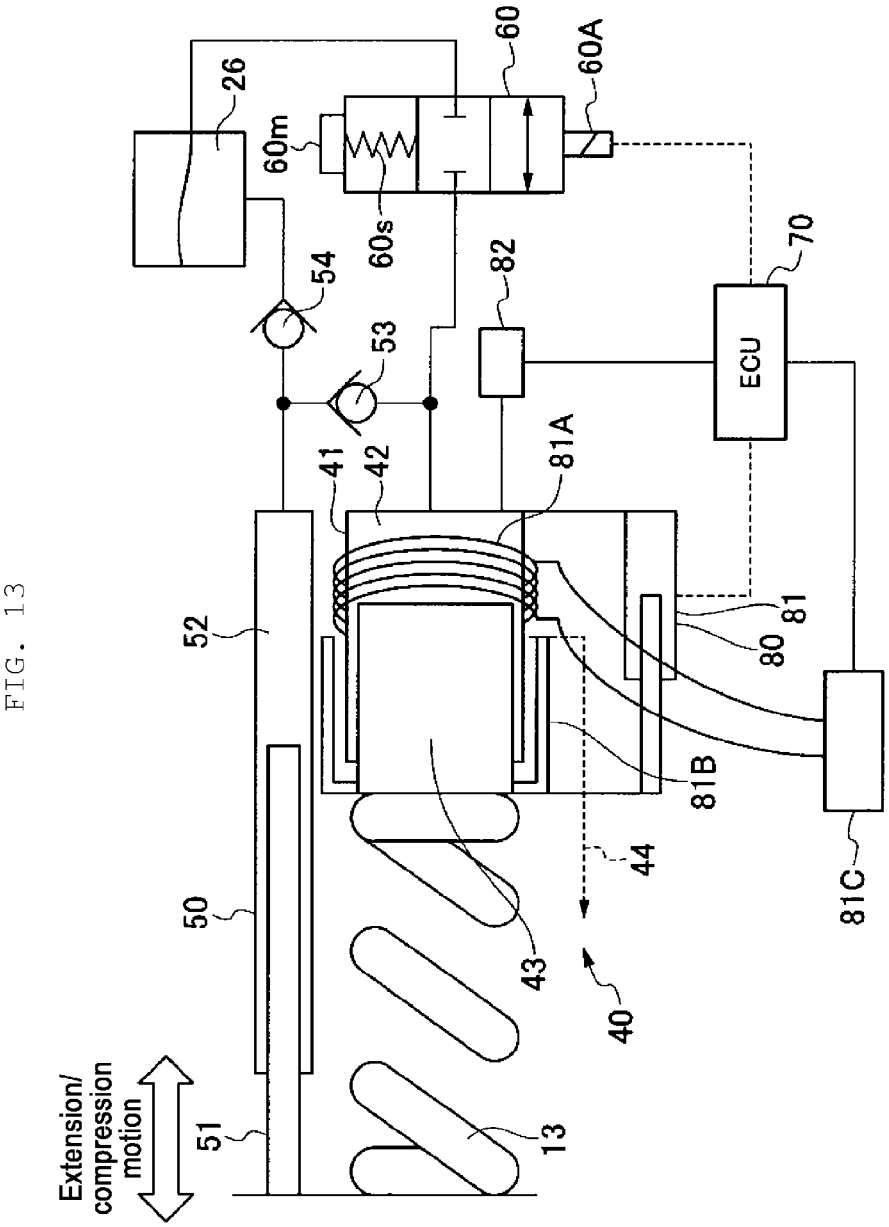
FIG. 13 is a circuit diagram showing a modification of the control circuit.

(VII) Current Application Control Method 7 (FIG. 13)

When the change-over valve 60 is the normal close valve as shown in FIG. 13, a permanent magnet 60m for setting the change-over valve 60 in the open position resisting the spring 60s of the change-over valve 60 turned on the ECU 70 is provided. Therefore, the change-over valve 60 is held in the open position by the permanent magnet 60m when the ECU 70 outputs an OFF signal. The change-over valve 60 is switched to the closed position at the time of the current application to the solenoid 60A when the ECU 70 outputs an ON signal.

Consequently, under the vehicle height reducing control mode in which the change-over valve 60 functioning as the normal close valve is opened by the permanent magnet 60m, when the solenoid 60A of the change-over valve 60 is turned on to start up the change-over valve 60 or holds the change-over valve 60 in the closed position and set in the vehicle height increasing control mode or the vehicle height retaining mode, if the solenoid 60A generates an electromagnetic force enough for cancelling a magnetic force of the permanent magnet 60m, the change-over valve 60 is started up and held in the closed position with a force of the spring 60s. Therefore, an extremely small current is sufficient for the startup current and the holding current that should be applied to the solenoid 60A.

The present invention is explained above in detail with reference to the drawings. However, a specific configuration of the present invention is not limited to the embodiment. A change in design and the like not departing from the spirit of the present invention are included in the present invention.

The present invention provides a vehicle height adjusting device for a motorcycle including: a hydraulic pump and a hydraulic jack provided in a damper interposed between a vehicle body and an axle; an electromagnetic change-over valve configured to implement switching to connect a jack chamber of the hydraulic jack and an oil reservoir chamber of the damper; and control means for controlling current application to a solenoid of the change-over valve according to a detection result of vehicle height detecting means in order to control opening and closing of the change-over valve thereby supplying and discharging oil ejected by the hydraulic pump to and from the jack chamber of the hydraulic jack and adjusting vehicle height. After applying a startup current to the solenoid of the change-over valve to thereby switch an actuation position of the change-over valve, while switching an applied current to the solenoid to a holding current which is smaller than the startup current and holding the actuation position of the change-over valve, the control means intermittently applies a large current, which is larger than the holding current, to the solenoid. Consequently, it is possible to reduce current consumption for switching and holding an actuation position of the electromagnetic change-over valve included in the vehicle height adjusting device for a motorcycle and surely hold the actuation position.

EXPLANATION OF REFERENCE NUMERALS 1 motorcycle
2 vehicle body
3 axle
10 rear suspension
10A damper
26 oil reservoir chamber
40 rear-wheel side vehicle height adjusting device
41 hydraulic jack
42 jack chamber
50 hydraulic pump
60 electromagnetic change-over valve
60A solenoid
60m permanent magnet
60s spring
70 ECU (control means)
80 vehicle height detecting means
82 hydraulic pressure detecting means
100 current monitoring circuit

What is claimed is:

1. A vehicle height adjusting device for a motorcycle comprising:
a hydraulic pump and a hydraulic jack provided in a damper interposed between a vehicle body and an axle;
an electromagnetic change-over valve configured to implement switching to connect a jack chamber of the hydraulic jack and an oil reservoir chamber of the damper; and
control means for controlling current application to a solenoid of the change-over valve according to a detection result of vehicle height detecting means in order to control opening and closing of the change-over valve thereby supplying and discharging oil ejected by the hydraulic pump to and from the jack chamber of the hydraulic jack and adjusting vehicle height, wherein
after applying a startup current to the solenoid of the change-over valve to thereby switch an actuation position of the change-over valve, while switching an applied current to the solenoid to a holding current which is smaller than the startup current and holding the actuation position of the change-over valve, the control means intermittently applies a large current, which is larger than the holding current, to the solenoid.

2. The vehicle height adjusting device for the motorcycle according to claim 1, wherein the control means integrates a time of current application to the solenoid of the change-over valve or monitors a temperature of the solenoid and, when the integrated value of the current application time or the monitored temperature exceeds a fixed value, extends a current application interval for the solenoid or stops the current application to the solenoid or extends a time interval for intermittently applying the large current to the solenoid.

3. The vehicle height adjusting device for the motorcycle according to claim 1, wherein the control means monitors, by means of a monitoring circuit, the applied current to the solenoid of the change-over valve and, when an abnormality occurs to current application, stops the current application to the solenoid.

4. The vehicle height adjusting device for the motorcycle according to claim 1, wherein
the change-over valve is a normal open valve,
hydraulic pressure detecting means for the jack chamber in the hydraulic jack is provided, and
the control means increases or reduces the holding current with respect to a closed position of the change-over valve according to an increase or a decrease in a pressure detected by the hydraulic pressure detecting means.

5. The vehicle height adjusting device for the motorcycle according to claim 1, wherein
the change-over valve is a normal open valve, hydraulic pressure detecting means for the jack chamber in the hydraulic jack is provided, and the control means sets the holding current with respect to a closed position of the change-over valve such that the change-over valve is switched from the closed position to an open position when a pressure detected by the hydraulic pressure detecting means reaches preset blow pressure.

6. The vehicle height adjusting device for a motorcycle according to claim 1, wherein the change-over valve is a normal close valve, a permanent magnet for setting the change-over valve in an open position is provided, and the change-over valve is set in a closed position in accordance with current application to the solenoid of the change-over valve.

* * * * *